United States Patent [19]

Itkin

[11] Patent Number: 5,657,324
[45] Date of Patent: Aug. 12, 1997

[54] BIDIRECTIONAL COMMUNICATION SYSTEM

[75] Inventor: Yuval Itkin, Holon, Israel

[73] Assignee: Motorola, Inc., Schaumburg, Ill.

[21] Appl. No.: 500,727

[22] Filed: Jul. 11, 1995

[30] Foreign Application Priority Data

Jul. 27, 1994 [GB] United Kingdom ............... 9415154

[51] Int. Cl.$^6$ ................... H04B 1/56; H04L 5/14
[52] U.S. Cl. .................. 370/276; 323/277; 340/310.06; 375/220
[58] Field of Search ..................... 370/276, 282, 370/284, 294, 295; 323/205, 207, 273, 275, 276, 277, 278, 281; 340/310.01, 310.02, 310.06; 375/219, 220, 259

[56] References Cited

U.S. PATENT DOCUMENTS

| | | | |
|---|---|---|---|
| 4,450,571 | 5/1984 | Hirayama et al. | 375/219 |
| 4,477,896 | 10/1984 | Aker | 370/24 |
| 4,698,800 | 10/1987 | Cavaliere et al. | 370/24 |
| 4,740,952 | 4/1988 | Vernieres et al | 370/24 |
| 5,440,543 | 8/1995 | Wakabayashi | 370/24 |

FOREIGN PATENT DOCUMENTS

| | | | |
|---|---|---|---|
| 0421471 | 10/1990 | European Pat. Off. | G08C 25/02 |
| 2130457 | 11/1983 | United Kingdom | H04J 15/00 |

Primary Examiner—Alpus H. Hsu
Attorney, Agent, or Firm—Robert M. Handy; Harry A. Wolin; Rennie William Dover

[57] ABSTRACT

A bidirectional communication system for communicating signals between a master device (1) and a slave device (2) connected by a single wire (3), in which the master device (1) includes a voltage signal generator (4) for generating voltage signals to be transmitted to the slave device (2) over the wire (3), a current sensor (6) for sensing current consumed on the wire (3), and a received signal generator (14, 19) for generating received signals corresponding to the sensed current consumption. The slave device (2) includes a receiver (7) for receiving the voltage signals transmitted over the wire and producing received data therefrom, and a current consuming device (8) for consuming current from the wire (3) in correspondence with a signal to be transmitted to the master device (1).

8 Claims, 2 Drawing Sheets

BIDIRECTIONAL COMMUNICATION SYSTEM

FIELD OF THE INVENTION

This invention relates to bidirectional communication systems.

BACKGROUND OF THE INVENTION

Known communication systems transfer either current or voltage between the communicating devices. Basically, a transmitting device sends data serially, by a series of voltage, or current, levels, which the receiving device decodes. Such a system requires a single wire per data transfer channel. If it is desired to communicate bidirectionally (in full duplex mode), two wires must be provided, one for each direction.

It is also known to use modulation techniques, such as time or frequency division multiplexing in order to have bidirectional communication over a single wire. However, these techniques require a modulator and a demodulator at each end. Such modulator/demodulators (modems) are usually relatively complex and require special filters and higher bandwidths, which lowers the noise immunity of the system.

It is therefore an object of the present invention to provide a bidirectional communication system which overcomes, or at least reduces, the disadvantages of known systems.

BRIEF SUMMARY OF THE INVENTION

Accordingly, the invention provides a bidirectional communication system for communicating signals between a master device and a slave device connected by a single wire, wherein:

the master device comprises a voltage signal generator for generating voltage signals to be transmitted to the slave device over the wire, a current sensor for sensing current consumed on the wire, and a received signal generator for generating received signals corresponding to the sensed current consumption;

the slave device comprises means for receiving the voltage signals transmitted over the wire, and current consuming means for consuming current from the wire in correspondence with a signal to be transmitted to the master device.

In one preferred embodiment a plurality of slave devices are connected to the master device by the same single wire. Preferably, the signals are digital, but they could, alternatively, be analog, for example audio signals.

BRIEF DESCRIPTION OF THE DRAWINGS

One embodiment of the invention will now be more fully described, by way of example, with reference to the drawings, of which.

DETAILED DESCRIPTION

Figure 1:
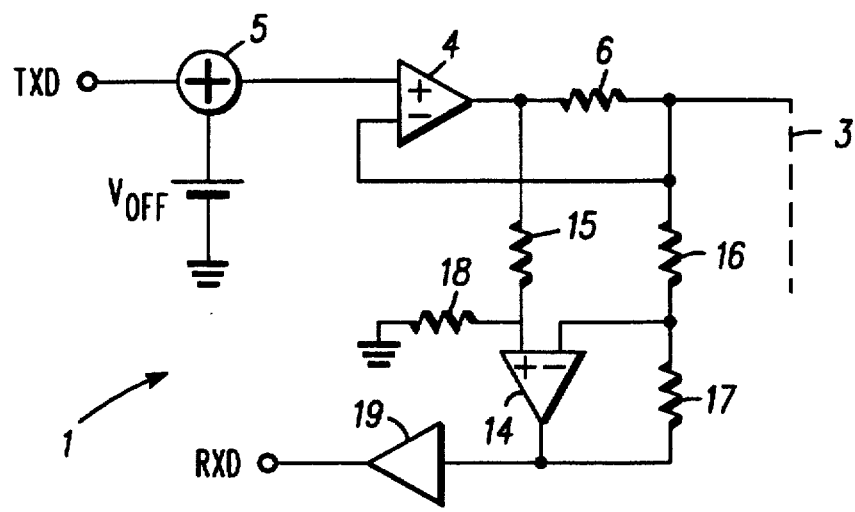
FIG. 1 shows a block schematic diagram of a master device.
Figure 2:
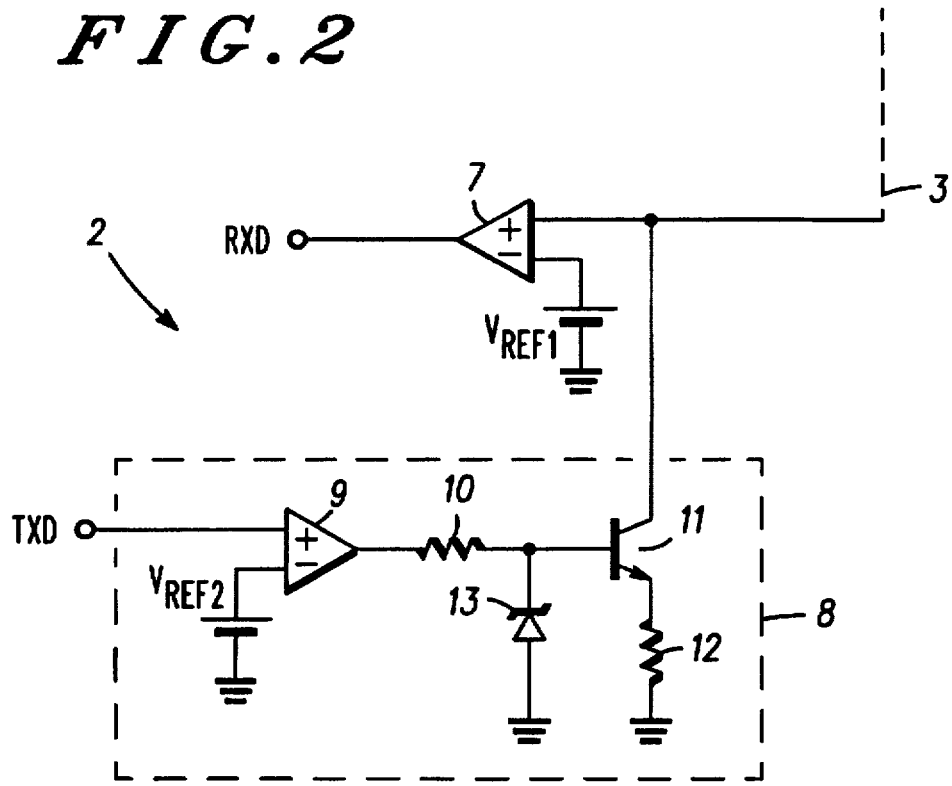
FIG. 2 shows a block schematic diagram of a slave device for communicating with the master device of FIG. 1 over a single wire.
Figure 3:
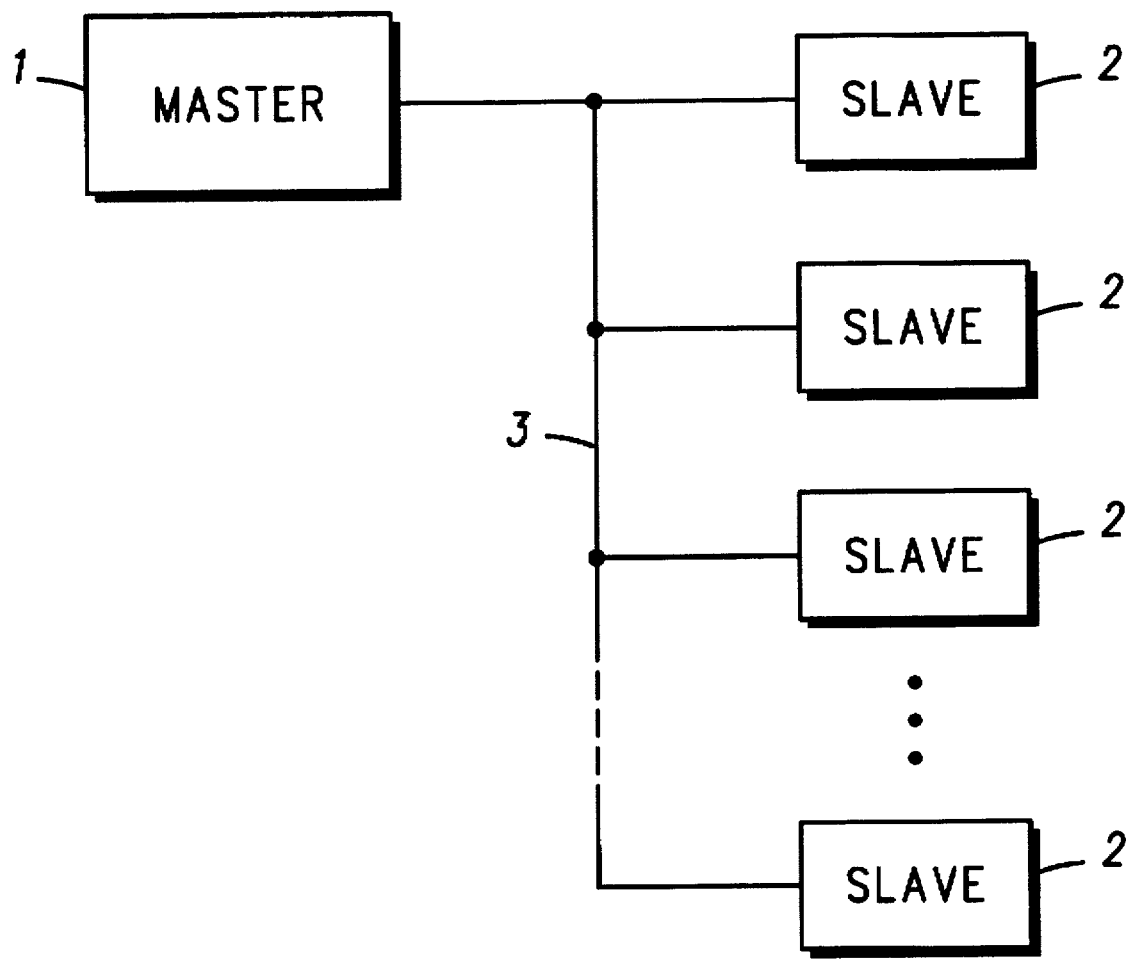
FIG. 3 shows a simplified block diagram of a master device coupled to multiple slave devices.

According to one embodiment of the invention, a bidirectional communication system includes a master device 1, as shown in FIG. 1, and one or more slave devices 2, as shown in FIG. 2, connected to the master device 1 by a single wire line 3 as shown in FIG. 3.

As shown in FIG. 1, the master device 1 includes an operational amplifier 4 coupled to receive at one input data to be transmitted (TDX), which has been biased by an offset voltage $V_{OFF}$ via an adder 5. The other input of the operational amplifier 4 is coupled to receive voltage signals being passed to the line 3 in the form of a feedback arrangement. The operational amplifier 4 converts the data to be transmitted (TDX) into voltage levels which correspond to the appropriate logic level of the data. For example, a logical "1" can be at 15 V and a logical "0" at 8 V. The voltage levels output from the operational amplifier are then passed for transmission down the line 3 via a current sensing resistor 6.

As shown in FIG. 2, the slave device 2 receives the voltage signals from the line 3 and translates them back into logical levels using a comparator 7 having one input coupled to receive the signals from the line 3 and a second input coupled to a first voltage reference source $V_{REF1}$. The output of the comparator 7 thus produces the received data signals RXD. The comparator 7 has hysteresis to increase noise immunity.

In order to transmit data (TXD) down the line back to the master device 1, the slave device is provided with a voltage to current converter 8 which consumes current from the line 3 according to the logic level required to be transmitted. The converter 8 includes a comparator 9 having one input coupled to receive the data to be transmitted (TDX) and a second input coupled to a second voltage reference source $V_{REF2}$. The output of the comparator 9 is used, via resistor 10, to control the base of a transistor 11, whose collector is coupled to the line 3 and whose emitter is coupled to ground reference potential via a current sinking resistor 12 having resistance value $R_S$. A Zener diode 13 is also coupled between the base of transistor 11 and ground reference potential so that the current I on line 3 is given by:

$$I = V_Z - V_{BE}/R_S$$

where $V_Z$ is the voltage across the Zener diode 13 and $V_{BE}$ is the base emitter voltage of the transistor 11. Thus, the current sinking resistor 12 is alternately switched into and out of electrical connection with the line 3 by the transistor 11 being alternately conducting and non-conducting. When the resistor 12 is connected to the line 3, it sinks current from the line so that current on the line is alternately consumed and not consumed. Of course, the current itself is provided on the line by the master device 1, not the slave device 2, which does not generate current itself.

The current level on the line 3 is sensed by the master device 1 by means of the current sensing resistor 6, as best shown in FIG. 1. The current across this resistor 6 is passed to the inputs of an operational amplifier 14 via resistors 15 and 16, with the negative input receiving the current on the line side of the resistor 6 and being coupled in a feedback arrangement via a resistor 17 to the output of the amplifier 14, and the positive input receiving the current from the other side of the resistor 6 and being coupled to a ground reference potential via a resistor 18. The output of the amplifier 14 thus provides a signal indicating the amplitude of current flow in the line 3. This signal is passed to a further voltage translator 19, which translates the signals into received data (RXD) logical levels, for example, a current level on the line of less than 10 mA can be equated with a logical "0" and a current level of more than 20 mA can be equated with a logical "1". Again, both the voltage translator 19 and the amplifier 14 incorporate hysteresis in order to control their noise immunity.

The current signals on the line and the voltage signals are generally of different frequencies. Since the slave device does not generate the current, the invention allows a system having a number of slave devices all communicating with the one master device on a polling basis. For example, the master device can send out a request, which can be read by all the slave devices even though only one will respond at any one time.

It will be appreciated that although only one particular embodiment of the invention has been described in detail, various modifications and improvements can be made by a person skilled in the art without departing from the scope of the present invention.

The invention claimed is:

1. A bidirectional communication system for communicating signals between a master device and a slave device connected by a single wire, wherein:

the master device comprises a voltage signal generator for generating voltage signals to be transmitted to the slave device over the wire, wherein the voltage signal generator generates a DC bias and an AC signal, the AC signal corresponding to information desired to be transmitted from the master device to the slave device, wherein the master device comprises a current sensor for sensing current consumed on the wire, said current sensor having a first terminal coupled to an output of the voltage signal generator and a second terminal coupled to the wire, and wherein the master device comprises a received signal generator for generating received signals corresponding to the sensed current consumption, said received signal generator having a level shifter to translate said received signals to further signals of different magnitude and off-set, and further, wherein the voltage signal generator further includes a feedback path extending from the second terminal of the current sensor to an input terminal of the voltage signal generator; and the slave device comprises means for receiving the voltage signals transmitted over the wire, and current consuming means for consuming current from the wire in correspondence with a signal to be transmitted to the master device, wherein said current consuming means comprises a current sink coupled to the wire via a controllable switch whereby the current sink consumes current from the wire according to the signal to be transmitted by the slave device.

2. A bidirectional communication system according to claim 1, wherein said current sensor comprises a resistor coupled in series in the wire and an amplifier coupled to receive signals from either side of the resistor to produce output signals corresponding to the current on the wire.

3. A bidirectional communication system according to claim 1, wherein said controllable switch comprises a transistor whose base is controlled by the level of the signal to be transmitted by the slave device.

4. A bidirectional communication system according to claim 1, wherein a plurality of slave devices are connected to the master device by the same single wire.

5. A bidirectional communication system according to claim 1, wherein the signals are digital.

6. A bidirectional communication system according to claim 1, wherein the signals are analog.

7. A bidirectional communication system according to claim 6, wherein the signals are audio signals.

8. A master device for use in a bidirectional communication system comprising a voltage signal generator for generating voltage signals to be transmitted to a slave device over a single wire, wherein the voltage signal generator generates a DC bias and an AC signal, the AC signal corresponding to information desired to be transmitted from the master device to the slave device, wherein the master device comprises a current sensor for sensing current consumed on the wire, said current sensor having a first terminal coupled to an output of the voltage signal generator and a second terminal coupled to the wire, and wherein the master device comprises a received signal generator for generating received signals corresponding to the sensed current consumption, said received signal generator having a level shifter to translate said received signals to further signals of different magnitude and off-set, and further, wherein the voltage signal generator further includes a feedback path extending from the second terminal of the current sensor to an input terminal of the voltage signal generator.

* * * * *